No. 866,801. PATENTED SEPT. 24, 1907.
J. H. McELROY.
VOTING MACHINE.
APPLICATION FILED JAN. 23, 1899. RENEWED SEPT. 21, 1903.

Witnesses: Inventor:
R. J. Jacker, John Howard McElroy.
Allan A. Murray

No. 866,801. PATENTED SEPT. 24, 1907.
J. H. McELROY.
VOTING MACHINE.
APPLICATION FILED JAN. 23, 1899. RENEWED SEPT. 21, 1903.

Witnesses:
Inventor:
John Howard McElroy

No. 866,801. PATENTED SEPT. 24, 1907.
J. H. McELROY.
VOTING MACHINE.
APPLICATION FILED JAN. 23, 1899. RENEWED SEPT. 21, 1903.

Witnesses:
W. J. Jacker.
Allan A. Murray

Inventor:
John Howard McElroy

No. 866,801. PATENTED SEPT. 24, 1907.
J. H. McELROY.
VOTING MACHINE.
APPLICATION FILED JAN. 23, 1899. RENEWED SEPT. 21, 1903.

Witnesses:
R. J. Jacker,
Allan A. Murray

Inventor:
John Howard McElroy

UNITED STATES PATENT OFFICE.

JOHN HOWARD McELROY, OF CHICAGO, ILLINOIS.

VOTING-MACHINE.

No. 866,801.  Specification of Letters Patent.  Patented Sept. 24, 1907.

Application filed January 23, 1899, Serial No. 703,068. Renewed September 21, 1903. Serial No. 174,114.

*To all whom it may concern:*

Be it known that I, JOHN HOWARD MCELROY, a citizen of the United States, and residing at Chicago, in the county of Cook and State of Illinois, have invented certain new and useful Improvements in Voting-Machines, of which the following is a specification.

My present invention is primarily concerned with a voting machine in which compressed air is employed as the power or direct means for operating the registers corresponding to the selection of the voter as shown by the register selecting members left by him in the operative position as he leaves the machine.

My present invention is also concerned with a novel combination consisting of interlocking mechanism interposed between the register selecting or setting members of two or more series whereby one of the members of one series must be operated before any of another series can be operated.

My invention is further concerned with certain other novel combinations which will be fully described in the body of the specification and particularly pointed out in the claims.

To illustrate my invention, I annex hereto a set of drawings in which the same letters of reference are employed to designate identical parts in all the figures, of which:

Fig. 3ª is a front elevation of a portion of the keyboard showing an arrangement of the keys for compelling the voter to vote for a candidate as a member of a board when he votes for him as president of said board.

Figure 1:
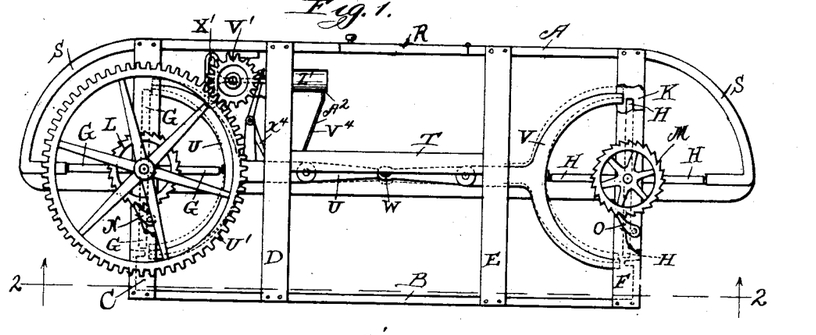
Figure 1 is a top plan view of the machine and the inclosing booth, showing principally the construction employed by me to prevent more than one person occupying the booth at the same time, and also the construction by which I utilize the operation of the turnstile by the voter in leaving the booth to actuate and re-set the machine.
Figure 2:
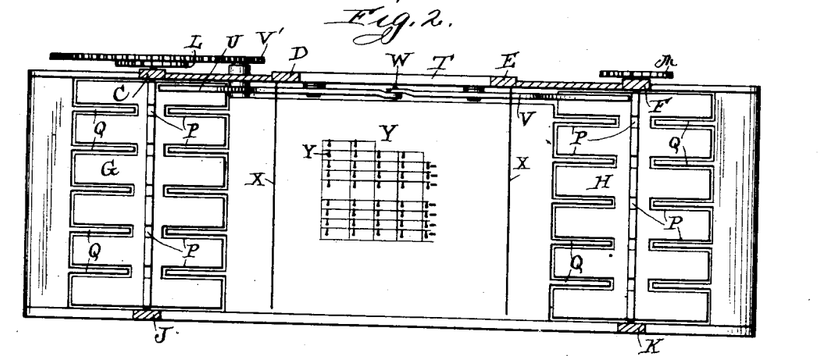
Fig. 2 is a front elevation of the machine on the line 2—2 of Fig. 1.

The booth which I employ is of a substantially rectangular shape, and is open at the top to permit of the entrance of light, and is closed at its ends by a pair of interconnecting turnstiles. The rear part of the casing A is joined to the front part B by the cross pieces C, D, E and F. The turnstiles G and H have the upper ends of their vertical axes journaled in the cross pieces C and F respectively, while their lower ends are journaled in the similar cross pieces J and K constituting a portion of the flooring of the booth. To prevent the retrograde movement of these turnstiles, they are provided at their upper ends with the ratchet wheels L and M, which coöperate with the spring-pressed pawls N and O in the customary manner. The four leaves of each of the turnstiles are provided with the deep notches P, which are necessary to permit their rotation beyond the horizontal pins Q projecting into the path of the turnstiles from the central partition of the casing to prevent the voters from passing into the rear part of the machine, which is only accessible through the door R which is kept locked, and is only to be opened by the proper election officials. The rear sides of the ends of the booth are provided with the curved shields S which form a continuation of the casing. The voter enters the booth at the right-hand side, turning the stile one quarter of a revolution in so doing, and leaves by the turnstile G, likewise turning it one quarter of a revolution in the same direction. To prevent the entrance of another person while he is in the booth, his action in entering it locks the turnstile H, and unlocks the turnstile G, but the fact that the turnstile cannot be turned backwards prevents anybody from entering through the turnstile G, and as the voter leaves the booth, the movement of the turnstile G unlocks the turnstile H. The mechanism for obtaining this action is as follows: Pivotally mounted on the under side of the central longitudinal beam T are two levers U and V, each of which has its outer end formed with a substantially semi-circular yoke coöperating with the leaves of the turnstiles. The levers U and V are pivotally connected at their inner ends by a loose bolt W, the play of which in the elongated apertures is sufficient to permit of the slight vibration given to these levers in the operation of the machine. By reference to Fig. 1, it will be seen that if the turnstile G is attempted to be operated, the rear leaf will contact with the rear arm of the fork of the lever U and prevent any movement, so that this turnstile is locked. The turnstile H, however, is unlocked, as it will be seen that the forward arm of the fork is just out of the path of the front leaf of the turnstile. When, however, the turnstile H is advanced the necessary quarter of a revolution to admit the voter, the inwardly projecting leaf will turn to the position of the rearwardly projecting leaf, and in so doing will contact with the rear arm of the fork and move it to the dotted line position. This movement brings the front arm of the fork in front of the front leaf of the turnstile, and thus locks it. The connection of the lever V with the lever U has moved the lever U to the dotted line position so that the rear arm of the fork is out of the path of the leaf, so that the voter can operate the turnstile in leaving the booth. As he leaves the booth, the lever U is thrown back to the full line position of Fig. 1, thereby locking the turnstile G and unlocking the turnstile H. To prevent any outside observer from peering through the notches P and watching the voter, thus destroying the secrecy of the ballot, I provide the curtains X, which hang from the cross beams D and E so as to screen the voter from view while he is at the keyboard.

The register selecting or setting members are in the form of keys Y, preferably of the reciprocating lever type. Each of the ordinary keys Y is provided with the handle bearing arm Z and the horizontal shaft A' to which the handle is rigidly fastened. This shaft A' projects through the front and rear plates B' and C' of the keyboard. Each key normally stands with its arm Z vertical, and in operating it the arm is swung down to the horizontal position indicated by the dotted lines in Fig. 5. To adjust the key accurately in these two positions, and to prevent its being accidentally misplaced, I provide the following mechanism. On the surface of the plate B' I fasten the rectangular box D', the upper end of which is closed by the enlarged collar E' by which the handle Z is secured to the shaft A'. This box D' has slidingly mounted therein the plunger F', which is of the shape clearly shown in Fig. 5, and which is pressed forward by the expanding spring G' interposed between it and the end of the casing D'. This plunger coöperates with the two correspondingly shaped notches H' in the collar E', and when the handle is moved anywhere near either of its two positions, the beveled edges of the plunger F' coöperate with the notches to bring it to its exact adjustment. To prevent any possible turning of the key beyond the two positions, I provide the lugs J' and K', which coöperate with the squared ends of the casing D' in a manner which will be readily apparent.

To permit of the operation of but a single key in any one of the candidate rows, in which the different party candidates for the same office are arranged in the customary manner, I provide the cable L', which may be of wire, chain, or other strong material or structure, which is rigidly secured at both ends, and which passes through the short tubes M' inserted in the shafts A' in the manner to be described. At one end of the cable L', I secure it to the bolt N', which passes through the stud O' projecting from the rear side of the front plate B', and arrange a nut and lock nut to adjust the bolt N' in any desired position so as to give the exact amount of play necessary to the cable. The tubes M' are screwed into correspondingly sized apertures bored through the shafts A', and normally stand in a horizontal position. When in this horizontal position, there is a certain amount of slack in the cable L'. When any key has been operated, its tube M' is turned to a vertical position, which just takes up all of the slack in the cable. After any key in the row has been operated, if another key should be operated in the same row, the pull of the cable caused by the operation of the last key would cause the first key to be returned to its normal position, thereby unsetting it. The action of the plunger F' insures the complete re-setting of any key by the subsequent operation of another in the same row.

Figures 5, 6, 7, 8, 9, 10:
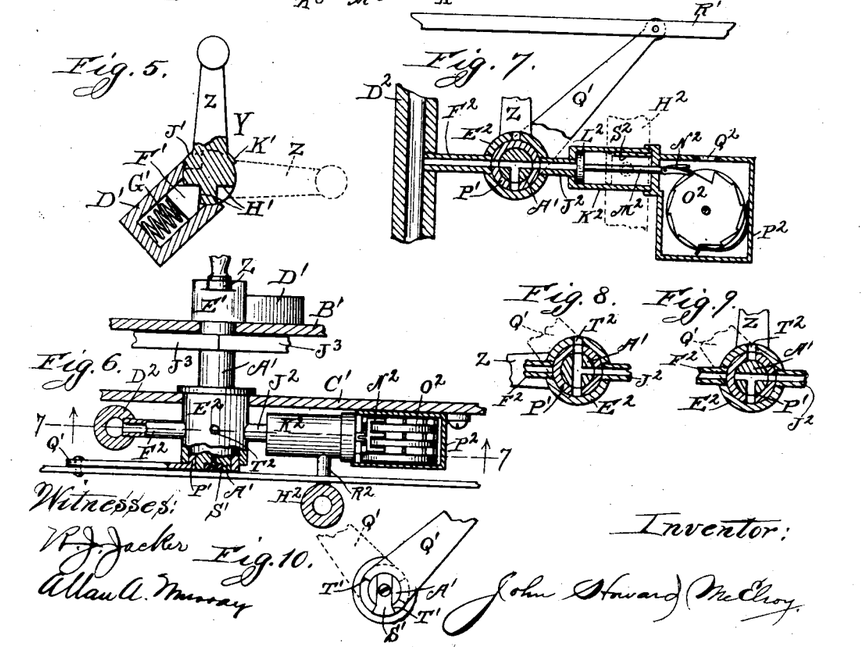
Fig. 5 is a detail of one of the keys showing the construction of the spring-pressed stop plug.
Fig. 6 is a plan view, partially in section and with some of the parts broken away, disclosing the construction and connections of the controlling apparatus for one of the registers.
Fig. 7 is a sectional view of the same mechanism on the line 7—7 of Fig. 6.
Figs. 8 and 9 are sectional views of the controlling valves in different positions from that shown in Fig. 7.
Fig. 10 is a detail view showing the rear end of one of the controlling valves.

Each of the shafts A' has surrounding its rear end a short hollow shaft or sleeve P', which has an arm Q' formed integral therewith or fastened thereto at right angles. The outer end of each of these arms Q' is pivotally connected to the rod or bar R' extending the length of the keys. The inner end of the shaft A' has thereon a lug S' shaped as shown in Fig. 10, and which may be conveniently secured thereto by forming the lug with an arm which takes into a groove cut in the end of the shaft A', and in which it is secured by a screw. This lug S' coöperates with the abutments T' formed by cutting away a portion of the sleeve P' in the same plane. In Fig. 10, it will readily be seen that if the shaft A' is moved from its normal to its operated position, the lug S' contacting with one of the abutments T' will carry with it the sleeve P' and arm Q' to the dotted line position. It will also be evident that when any arm Q' is thus operated, its connection with the rod R' will move all of the other sleeves P' and their arms Q' to the dotted line position, and without disturbing the shafts A'. Likewise, it will be evident that if any of the shafts has been moved to its operated position, the movement of the rod R' from its operated to its normal position will re-set any of the operated shafts A' in that row.

Figure 4:
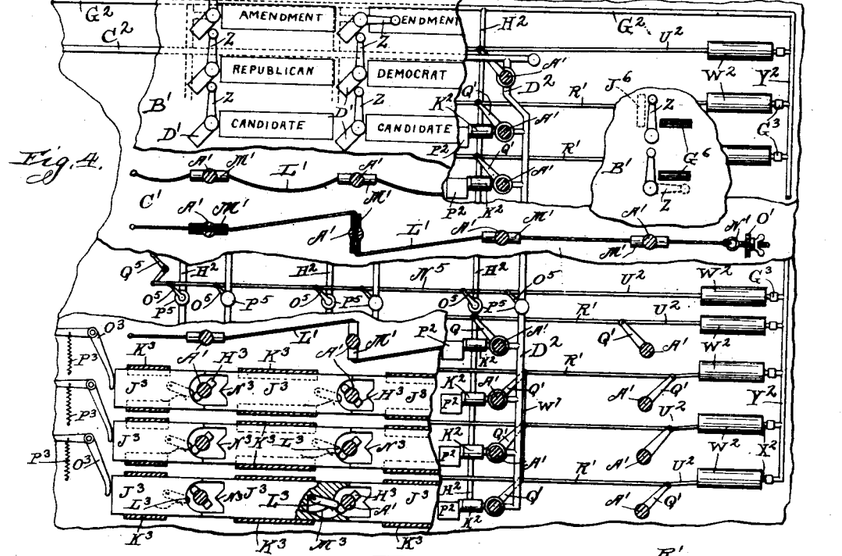
Fig. 4 is a front elevation, on a larger scale, showing the operative mechanism of the keyboard, and with some of the plates broken away on various planes to disclose the structure.
Figures 18, 23:
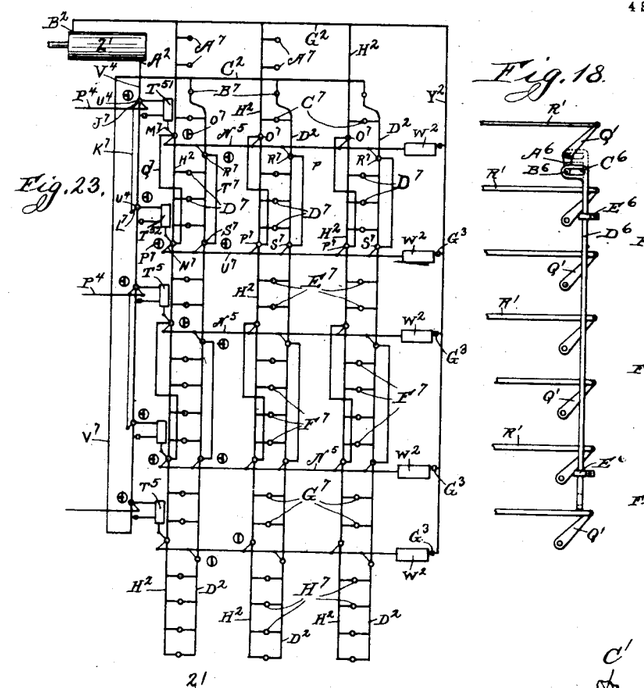
Figs. 18 and 19 are rear and side elevations of the mechanism for preventing the operation of any of the candidate keys until an amendment key has been operated.
Fig. 23 is a diagrammatic plan view of the air pipes and cut-off mechanism employed where a plurality of multi-candidate groups are necessary.
Figure 19:
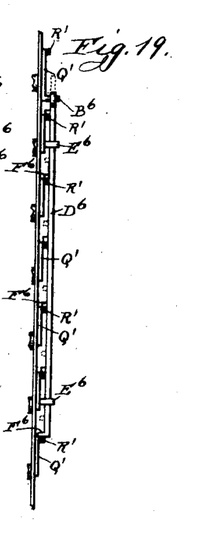

To operate the registers, I preferably employ air, compressed or exhausted, as may be required, and I preferably secure this supply of air by the following means: Referring again to Fig. 1, I rigidly mount upon the extreme upper end of the shaft of the turnstile G, a large gear wheel U', which meshes with a small gear wheel V' fastened to the crank shaft W' journaled in suitable bearings formed by lugs fastened to the casing. This crank shaft has the U-shaped crank portion passing through the elongated slot X' formed in the head of the piston rod Y'. This piston rod carries a piston on its inner end, which reciprocates in the cylinder Z', which has the two outlets $A^2$ and $B^2$. The packing of the piston rod in the adjacent end of the cylinder is air-tight, so that as the piston is pushed in, the air in front of it will be compressed, while the air back of it will be rarefied, or in other words, as the piston advances, the compressed air is forced out through the outlet A², while air is drawn in through the outlet B². As the stroke of the piston is reversed, the action is reversed, the air being drawn in through the outlet A² and forced out through B². The size of the gear wheels U' and V' are so proportioned that each quarter turn of the stile G, necessary to permit the departure of a voter, turns the gear wheel V' through one complete revolution, thus giving the piston on the piston rod Y' a complete reciprocation. The outlet A² is connected with a horizontal pipe C² extending across the top of the keyboard and in the rear of the partition C'. This pipe C² has a series of pipes D², one for each party row, and these pipes extend down along the side of the party row on the right-hand side, as shown in Figs. 4, 6 and 23, so that pressure may be furnished therefrom to each of the registers. The first key below the pipe C² in each party row is devoted to the straight ticket, and it consists of the same construction of the shaft A', sleeve P', arm Q', and connecting rod R', as has been previously described. The pipe has a horizontal valve casing E², such as shown in Fig. 6, surrounding the sleeve P' and supported by the partition C'. The valve casing E² has the pipe D² let into its upper and lower sides vertically, just as shown in Fig. 6, except that there the pipes that are let into the valve casing are horizontal. The valve casing E², the sleeve P', and the shaft A' have a hole bored through them so as to form a continuation of the pipe D² when the key is in its operated position. When the key is unoperated, the holes through the sleeve P' and the shaft A' will be at right angles to the direction of the pipe D² and the holes in the valve E² so that the air cannot pass any further into the pipes D² than to these straight key valves. On account of the locking cable L' being employed, it will be seen that it is only possible to admit the compressed air to one of these pipes D² at any operation of the machine. In connection with the ordinary candidate keys, the pipe D² and the valve casing E² are connected by the short horizontal pipe F², which has its ends oppositely screw-threaded, so that when the pipes D² are placed in their position relative to the valve casings E², the short pipes F² can be screwed into place by turning them in one direction, and this operation will also bring the pipes D² into the proper relative relation to the valve casings E². The outlet B² has connected therewith the horizontal pipe G², which is entirely above all of the keys in the machine, the upper row of which in Figs. 1 to 4 is shown as devoted to yes and no propositions, such as amendments, &c., while the two upper rows in the diagrammatic view of Fig. 23 are shown to be so adapted. The pipe G² has leading downward therefrom on the left-hand side of each of the party rows of keys the pipes H², one for each party row, and these pipes are theoretically connected to the valve casings E² in substantially the same way as the pipes D², except as to the straight ticket keys which have no connection whatever with the pipes H², and the amendment keys which are connected to said pipes while they have no connection whatever with the pipes D². The actual connections between the pipes H² and the valve casings E² are as follows: Exactly in line with the short tube F², but on the other side of the valve casing E², is the short tube J² similarly constructed, and having one end in the casing E² while the other end is let into the end of the cylinder K², which has the piston L² reciprocating therein, and attached to the piston rod M² passing out of the cylinder at the other end thereof and furnished with the three-armed pawl N² pivoted thereto, which coöperates with a set O² of three registering wheels of the ordinary deep-notch carrying construction, and which are mounted in the casing P² fastened to the rear of the partition C' and provided on their upper side with an aperture Q², which may be closed with glass if desired, through which the registration of the wheels may be seen. The construction is such that when the piston L² is moved to the right, the pawl N² will operate the register one place to indicate that one vote has been added thereto. The cylinder K² has leading from its rear side to the pipe H² a short tube R² similar to the short tube F². A stop S² is formed on the inside of the cylinder or fastened to the end of the cylinder into which the body of the cylinder is screwed, and which end may be conveniently formed as a part of the casing P², and serves to limit the movement of the piston L² to the dotted line position shown in Fig. 7. The valve casing E² in each of the candidate and amendment registers has the aperture T² in its upper surface. The sleeve P' has three apertures therein, arranged as clearly shown in Figs. 7 to 9, while the shaft A' has the three-way aperture therethrough, as clearly shown in said figures. The operation of these devices is as follows: With the parts in the position shown in Fig. 7, which is their normal unoperative position, supposing that the straight ticket key for that party series has been operated, the compressed air coming down through pipe D² will pass directly through the pipes F², sleeve P', shaft A', sleeve P', pipes J², and into the cylinder K², driving the piston L² to its dotted line position, thereby operating the register one place. From an examination of the drawing, it will be seen that there is no other escape for the compressed air, and in the operation it does not escape, unless slightly, as a result of leakage, but its force is expended in driving the piston L² as described. Referring now to Fig. 8, where the parts are shown in the position that they occupy when the key has been operated, the shaft A' having been moved through 90 degrees, and carrying with it the sleeve P', it will be seen that the compressed air from the pipe D² is shut off, even if it could have gotten past the valve of the straight ticket which is supposed to be closed in any party row in which the keys are operated for scratching purposes. The position of the valves and apertures, however, is such as to permit the outside air to pass through the aperture T² and to the rear of the piston L². If now the air is exhausted in the pipe H², as is the case in all these pipes when the piston rod Y' is advanced, by the voter leaving the booth, the air in the cylinder K² being rarefied, the outer air on the other side of it will rush in and force the piston L² forward in the same manner as occurred in the action by means of the compressed air through the straight ticket register, and thus the register of any candidate for whom a party candidate has been scratched will be operated. There is one other condition of the registers, and that is the one shown in Fig. 9, where the sleeve P' has been turned by the actuation of some other key in the same candidate row, but where the shaft A' has not been moved. In this case, it will be seen that the sleeve P' shuts off the straight ticket air pressure, while the shaft A' shuts off the outside air, and thus no action can take place in the cylinder $K^2$, the size of the tubing back of the piston being insufficient to permit the expansion of the air therein to drive the piston $L^2$ far enough to operate the register. Upon consideration, it will be seen that this position of Fig. 9 will represent the position of any of the keys in the party row for which a straight ticket can been voted, and that particular candidate scratched by operating a key in another row. It will also represent the position of the unoperated keys in the rows for which any candidate has been voted by turning a key. In the rows unoperated by the straight ticket and in which no scratched vote is cast, the parts will be in the position of Fig. 7, but inasmuch as no compressed air is furnished there will be no action of the registers.

To re-set the controlling mechanism for the registers, after the registers have been actuated, I employ the following mechanism: Each of the rods $R'$ has pivotally connected to it, preferably at the point where it is joined to the last arm $Q'$, a link $U^2$, which is pivotally connected at $V^2$ to what I may call a compound piston which reciprocates in the re-setting cylinder $W^2$. This cylinder $W^2$ is open at its inner end, and has its rear end connected by a short pipe $X^2$, resembling the small pipes $F^2$ in its construction, to the tube $Y^2$ connected with the tube $G^2$ and extending down along the outer end of the re-setting cylinders, of which there is one for every row of keys, as well as for each set of controlling cocks to be subsequently described. The piston $Z^2$ has one or more apertures $A^3$ passing therethrough, and the central aperture has passing therethrough a bolt $B^3$ to which the link $U^2$ is pivoted. This bolt has on its rear end a disk $C^3$ with a flange $D^3$ thereon which forms a cup-shaped valve which coöperates with an annular recess $E^3$ formed in the end of the cylinder. The bolt $B^3$ has one or more arms $F^3$ formed on its front end to coöperate with the piston $Z^2$ without covering the apertures $A^3$.

The operation of the mechanism is as follows: Supposing the piston $Z^3$ to be at the open end of the cylinder, as it is before the keys are operated, as soon as any key is turned, its motion is transmitted to the shaft $A'$, sleeve $P'$, arm $Q'$, rod $R'$, and link $U^2$, so as to force the piston $Z^2$ to the right. As this would necessitate a considerable compression of the air in the cylinder and in the pipes $Y^2$, $G^2$ and $H^2$, I preferably employ the construction shown in which the first movment of the link $U^2$ will be to force the bolt $B^3$ through its aperture in the piston $Z^2$ until the apertures $A^3$ are uncovered, the valve disk $C^3$ being moved away from them. As the piston is now advanced to the right, the air can escape through the apertures $A^3$. When the piston in the cylinder $Z'$ is moved back, its action will be to compress the air in the tubes $G^2$, $H^2$ and $Y^2$, and this compressed air will first force the valve disk $C^3$ to the dotted line position of Fig. 17 where it rests against the rear side of the piston $Z^2$ and closes the apertures $A^3$. The purpose of preferably employing the cup-shaped valve is to insure the apertures $A^3$ being covered before there is any possibility of the compressed air getting access to the piston $Z^2$, and escaping through the apertures $A^3$ without moving the piston. To prevent any possible compression of the air in the tubes $Y^2$, $G^2$, and $H^2$, by the operation of a large number of scratched ticket keys, which compression would interfere with the rarefying effect of the first movement of the piston in the cylinder $Z'$, I may provide the check valves $G^3$, which are of any ordinary construction, in the pipes $X^2$. These check valves are so constructed as to prevent the passage of the air from the cylinder $W^2$ into the pipe $Y^2$, but to permit the passage of the air under pressure from the tube $Y^2$ to the cylinders $W^2$. It will readily be seen that as the piston in the cylinder $Z'$ moves back when the voter leaves the booth, the compressed air will force all the pistons $Z^2$ to the open end of the cylinder, thus moving all the arms $Q'$ to the left, or to their unoperated position, and the action of this arm against the lugs $S'$ on the shafts $A'$ of the keys will be to re-set all the keys to their normal position.

In connection with some of the offices to be filled, such as county commissioners, judges, etc., several candidates are to be elected, and it is necessary to provide a construction in which each voter can cast one ballot each for as many candidates as are to be elected, and can choose these candidates irrespective of the party situation. Referring to Fig. 4, the three lower rows of keys are to be employed for a multi-candidate group of three, such as the trustees for the State University. Here three different candidates are presented by three different parties, and it may happen that instead of voting for the three candidates of one party, a voter may desire to vote for one candidate from each party, and it might occur that all three of the candidates for which he wishes to vote are arranged on the machine in the same horizontal line. It will be readily seen that the ordinary locking mechanism described above could not be employed as that permits the actuation of only one key in each horizontal row. It is further necessary to provide mechanism whereby if the voter should set the keys for more than the three candidates for which he is entitled to vote, the machine will refuse to operate for any of the candidates, and his vote will thus be cast out, as provided for by the election laws of this State. The mechanism provided for this will now be described.

Instead of employing the tubes $M'$ and the cable $L'$, the place of the tube $M'$ is taken by the piece $H^3$, which may be similarly screwed through an aperture in the shaft $A'$. The left-hand end of this piece $H^3$ is rounded, as shown in Fig. 4, while the right-hand end may be squared. Coöperating with these pieces $H^3$ are the locking blocks $J^3$, which are held in place so as to slide horizontally against the rear face of the partition $B'$ by the metallic straps $K^3$. The right-hand end of the central pieces $J^3$ are cut away in the arc of a circle, except that a sufficient portion is left to abut against coöperating ends of the block to the right. Pivotally mounted in a cavity formed in the side or end of the block $J^3$ is a pivoted dog $L^3$, which has its outer rounded end projecting into the semi-circular space formed in the end of the block. This dog $L^3$ can be swung down against the resistance of the leaf spring $M^3$ when it is necessary. In the unoperated position of the keys, the rounded end of the piece $H^3$ is below the end of the dog $L^3$, so that as the key is moved for operation, this rounded end of the piece $H^3$ takes against the projecting end of the dog $L^3$, and thereby cams the block $J^3$ to the left a distance equal to the space covered by the projecting portion of the dog $L^3$. After the key has been moved to its operated position, the blocks resume their normal position under the stress of a spring to be subsequently mentioned, and another key in the same row can be operated, thereby actuating the blocks again. To prevent the simultaneous operation of two blocks in the same row, the left-hand ends of the blocks $J^3$ are notched in the manner clearly shown in Fig. 4, the substantially square notch therein being broken by the projecting point $N^3$. From an examination of the figures, it will be apparent that as any key is operated, the blocks to the left will be slid to the left, provided that their movement is not interrupted. If an attempt should be made to operate two keys simultaneously, the rounded ends of the piece $H^3$ of the right-hand key would force the nose $N^3$ into the path of the square end of the piece $H^3$ of the left-hand key, and thus block the pieces from operation. When the machine is reset, the rounded noses of the pieces $H^3$ that have been operated will simultaneously cam the dogs $L^3$ downward against the slight resistance of the springs $M^3$ without moving the locking blocks $J^3$. As before stated, every time a key is operated, one or more of the blocks $J^3$ in that horizontal row will be moved to the left, the left-hand block always being moved. This movement is transmitted to the substantially vertical arm of the bell crank lever $O^3$, which is rocked against the resistance of the coiled spring $P^3$ attached to the horizontal arm and to the casing.

Figures 11, 12, 13, 14, 15, 16, 17:
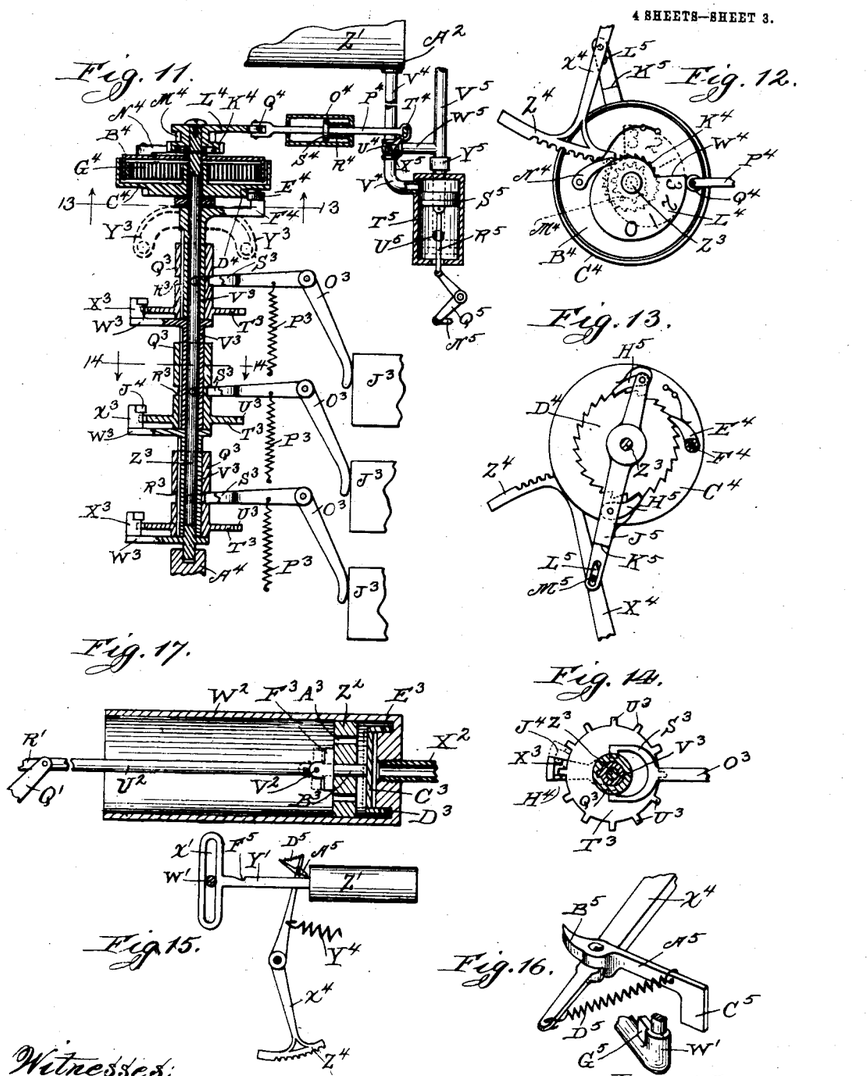
Fig. 11 is a central sectional view of the apparatus for controlling the multi-candidate groups.
Fig. 12 is a top plan view of a portion of the same apparatus.
Figs. 13 and 14 are sectional views of the same on the lines 13—13 and 14—14 respectively of Fig. 11.
Fig. 15 is a plan view of the lever for re-setting the multi-candidate group controlling mechanism, showing how it is actuated from the operating piston.
Fig. 16 is an enlarged detail of the mechanism shown in Fig. 15.
Fig. 17 is a central sectional view of one of the re-setting cylinders.

Referring now to Fig. 11, the upward movement of the horizontal arm of the bell crank $O^3$ occasioned by the movement of the locking block $J^3$ will serve to slightly raise a sleeve $Q^3$, which has a horizontal groove $R^3$ therein, into which extend pins formed on the inner sides of the fork $S^3$ constituting the end of the horizontal arm of the bell crank lever. This sleeve $Q^3$ terminates at its lower end in a disk $T^3$ having a number of spurs or teeth $U^3$ projecting from its periphery. These sleeves $Q^3$ are splined on the hollow tubular shafts $V^3$ so as to rotate therewith, but to be capable of vertical movement thereon. Each of these tubular shafts $V^3$ has projecting from its upper end an arm $W^3$, which carries a compound escapement lug $X^3$, which coöperates with the teeth $U^3$ of the adjacent disk $T^3$. The uppermost tubular shaft $V^3$ instead of being provided with the arm $W^3$ has one or more arms $Y^3$ by which it is rigidly connected to the partition $C'$. The place of the lowermost tubular shaft $V^3$ is taken by a central shaft $Z^3$ which is pivotally mounted in the support $A^4$ connected to the frame work of the machine, and has its upper end supported by the upper stationary sleeve $V^3$. This shaft $Z^3$ has connected thereto the lower arm $W^3$, which carries the customary compound escapement lug $X^3$. At the upper end of the shaft $Z^3$ is secured the spring cap $B^4$, which coöperates with another spring cap or plate $C^4$ journaled on the shaft $Z^3$ and having a ratchet disk $D^4$ on its under surface with which a spring-pressed pawl $E^4$ carried by an arm $F^4$ from the uppermost tubular shaft $V^3$ coöperates to prevent the retraction of the disk. The customary flat spiral spring $G^4$ is connected at one end to the downwardly turned annulus of the spring cap $B^4$, and at the other end to the upwardly projecting central annulus of the spring cap $C^4$, so as to keep the shaft $Z^3$ under a stress tending to rotate it from the left over to the right.

The action of this mechanism is as follows: Whenever any of the plates $J^3$ is moved to the left by the action of the key, through the bell crank $O^3$ the corresponding sleeve $Q^3$ is raised, carrying the teeth from the plane of the lower lug $H^4$ of the compound pallet into the plane of the upper lug $J^4$. This permits the movement of the pallet from the full line position of Fig. 14 to the dotted line position, where the upper pallet $J^4$ contacts with the next tooth $U^3$. When the sleeve and disk $T^3$ descend, the teeth are moved from the plane of the upper lug or pallet $J^4$ to the lower one $H^4$, and the arm $W^3$ is permitted to advance until the lower pallet $H^4$ engages with the tooth which the upper pallet $J^4$ has just been released from. Thus the advance of the arm $W^3$ the space of one tooth $U^3$ is permitted at each operation of one of the blocks $J^3$. If it be the lower sleeve $Q^3$ that is thus reciprocated vertically, only the shaft $Z^3$ and its arm $W^3$ will be moved. If the middle sleeve $Q^3$ be reciprocated the shaft $Z^3$ and all the mechanism surrounding it below the disk $T^3$ will also be moved. If the uppermost sleeve be reciprocated, the shaft $Z^3$ and all the mechanism below the uppermost disk $T^3$ will be advanced one space. Owing to the fact that the spring pressure runs throughout the entire combination, and to the fact that the horizontal arms of the bell cranks $O^3$ terminate in yokes operating in the horizontal grooves $R^3$, it is possible to reciprocate say the lower two of the bell cranks simultaneously, in which case the shaft $Z^3$ will be advanced the distance of two notches, or they may all three be reciprocated simultaneously, in which case the shaft $Z^3$ will be advanced three notches. Thus it will be seen that it is entirely immaterial whether two keys in different rows be operated successively or simultaneously.

Loosely journaled on the upper end of the shaft $Z^3$ is a short hollow sleeve that has on its lower end the ratchet $K^4$, and on its upper end the cam disk $L^4$, shaped as shown in Fig. 12, while between the ratchet and the cam disks is the mutilated pinion $M^4$. A spring-pressed pawl $N^4$ pivotally mounted on the upper side of the spring cap $B^4$ coöperates with the ratchet $K^4$ so as to carry the cam with the shaft $Z^3$, but to permit of the cam being advanced independently of the shaft for re-setting. Suitably mounted upon the casing in the same horizontal plane as the cam $L^4$ is the cylinder $O^4$ through which the rod $P^4$ passes. This link carries in its forked end the anti-friction roller $Q^4$ which coöperates with the periphery of the cam $L^4$. A helically coiled expanding spring $R^4$ is interposed between the end of the cylinder $O^4$ and the pin or disk $S^4$ fastened to the rod $P^4$, so as to keep the friction roller in contact with the periphery of the cam plate $L^4$. The right-hand end of the rod $P^4$ has a vertical slot $T^4$ therein, in which takes a horizontal pin on the arm $U^4$ of a three-way valve introduced into the pipe $V^4$ connected with the exit $A^2$ of the cylinder $Z'$. The purpose of this valve will be explained later, it being sufficient for the present to say that it operates mechanism to cut off the group candidate registers from the air supply when more than the correct number of candidates has been voted for. This result is accomplished as follows: With the cam disk $L^4$ in the dotted line position of Fig. 12, the machine is ready for operation. At each actuation of any of the multi-candidate group keys, the shaft $Z^3$, carrying with it the cam plate $L^4$, is advanced one space, and if just the three votes have been arranged for, the parts will occupy the position shown in full lines in Figs. 11 and 12, in which the air supply is not cut off from the multi-candidate group. In case the voter should operate one more key, the abrupt shoulder $W^4$ on the cam $L^4$ will be passed, and the spring $R^4$ will throw the rod $P^4$ to the left until it comes in contact with the portion of the cam periphery having the shortest radius. This movement cuts off the air supply in the manner to be subsequently explained. It is necessary after the machine has been operated to re-set this cam disk $L^4$ to initial position, and also to wind up the spring cap $C^4$. To effect these two results, I employ the following mechanism: Suitably pivoted in an elongated journal $E^5$ supported from the central partition of the casing and substantially midway between the piston rod $Y'$ and the spring cap $B^4$ is the lever $X^4$, which is normally held in the position shown in Fig. 15 by the coiled spring $Y^4$ connected to it and to the casing. The forward and lower end of this lever, which is in the plane of the pinion $M^4$, carries a segmental rack $Z^4$, which has just sufficient teeth to mesh with the mutilated pinion $M^4$, and has its end terminating in a portion arranged on the same curve, but with its outer side in the plane of the ends of the teeth. Its rear and upper end, which is in the plane of the cylinder $Z'$, has pivoted thereto the dog $A^5$ having the pawl tooth $B^5$ at one end, while its other end carries a downwardly projecting lug $C^5$. A coiled spring $D^5$ holds the pawl in engagement with the rear side of the piston rod $Y'$, with which it coöperates. As the piston is moved to the right, it does not affect the position of the lever $X^4$ which is held in the position shown by the spring $Y^4$, drawing the dog $A^5$ against the end of the cylinder $Z'$. As soon as the piston rod $Y'$ has reached the limit of its movement to the right, the nose $B^5$ of the dog $A^5$ engages with the notch $F^5$ cut in the piston rod, so that the lever $X^4$ is carried back with the piston rod during its return movement. At the end of this movement, a lug $G^5$ conveniently formed in the U-shaped portion of the crank shaft $W'$ contacts with the tail $C^5$ of the dog and disengages it from the notch $F^5$, when the action of the spring $Y^4$ immediately carries the lever $X^4$ back to its initial position. During its movement with the piston rod $Y'$, this ratchet $Z^4$ meshes with the mutilated pinion $M^4$ and carries it to the dotted line position of Fig. 12, when the mutilated portion of the gear comes into the plane of the teeth on the ratchet $Z^4$ and prevents any further movement. Thus the re-setting of the cam plate $L^4$ is accomplished. At the same time that the cam plate $L^4$ is re-set, I conveniently wind up the spring by means of the spring-pressed pawl $H^5$ which is mounted on the lever arm $J^5$ pivotally mounted on the shaft $Z^3$ between the ratchet disk $D^4$ and the upper end of the upper hollow shaft $V^3$. This arm $J^5$ has its rear end brought substantially into the plane of the lever $X^4$ by means of the curve at $K^5$, and this end lying directly beneath the lever $X^4$ has a slot $L^5$ through which passes a pin $M^5$ projecting downwardly from the lever $X^4$. Thus it will be seen that the reciprocation of the lever $X^4$ will advance the ratchet disk $D^4$, thus winding up the spring. As this re-winding apparatus is designed to wind up the spring at each operation, the greatest amount that it can be unwound, i. e., three teeth of the disk $T^3$, and as the multi-candidate balloting devices are not operated in the manner set out when a straight ticket is voted, I connect the spring $G^4$ with the spring cap $B^4$ by a connection which will cause the spring to slip when it is overwound. The well known split ring connection employed in watch barrels may be used for this purpose.

Referring now to Fig. 4, in which the three lower rows represent the three groups of candidates say for school trustees, and the one immediately above them represents the candidates for president of the board, I show a rod $N^5$ similar to the rods $R'$, and similarly connected to the arms $O^5$, which operate ordinary valves $P^5$ placed in the pipes $D^2$ and $H^2$ just above the keys for the president of the board. This rod $N^5$ is connected to a re-setting cylinder $W^2$ which is similar in every respect to the other re-setting cylinders described. At its left-hand end, the rod $N^5$ is connected to a bell crank $Q^5$, the other end of which (See Fig. 11) has connected to it the link $R^5$, which is pivotally connected to the piston $S^5$ in the cylinder $T^5$, which is open at its lower end. At its upper end, just above the normal position of the piston $S^5$, the cylinder $T^5$ has the pipe $V^4$ opening into it after having curved to a horizontal. About two-thirds of the way toward the bottom of the cylinder is an aperture $U^5$ formed by the opening into it of a pipe $V^5$. A cross pipe $W^5$ opens into the pipe $V^5$ and also into the pipe $V^4$ to form a three-way connection at the point where the arm $U^4$ controls a three-way valve $X^5$. The operation of this device is as follows. When the voter has not operated the multi-candidate rows for more than three candidates, the air under pressure during the advance of the piston rod $Y'$ passes through the three-way valve $X^5$ into the cross pipe $W^5$ and up the pipe $V^5$, its passing downward in the pipe $V^5$ being prevented by the check valve $Y^5$ interposed in said pipe between the cross pipe $W^5$ and the aperture $U^5$ in the cylinder, so that the air pressure passes straight to the machine without affecting the cylinder $T^5$. On the other hand, if the voter has operated the multi-candidate group for more candidates than he is entitled to vote for, the rod $P^4$ having sprung to its left-hand position turns the valve $X^5$ so as to shut off the air from the cross pipe $W^5$ and force it into the upper end of the cylinder $T^5$, where it forces the piston $S^5$ downward to the dotted line position until the air can escape through the aperture $U^5$ and thence through the pipe $V^5$ to the operating mechanism. When the piston $S^5$ passes to this lowermost position, the bell crank $Q^5$ being swung, the rod $N^5$ is moved to the right, operating all the valves $P^5$ and shutting off the air completely from all of the multi-candidate registers, as well as from the registers for the president of the board, although the latter is not essential. When the machine is re-set, the action of the re-setting cylinder on the rod $N^5$ will be to force the piston $S^5$ up to its normal position.

Figure 3:
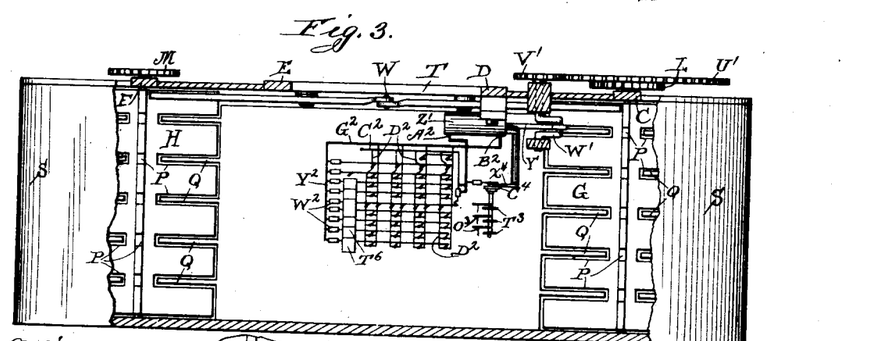
Fig. 3 is a rear elevation of the machine with a portion of the casing broken away to show the mechanism concealed thereby.
Figure 3A:
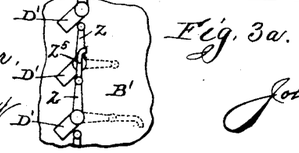

When the voter casts a ballot for any candidate as president of the board, it is desirable to have him vote for the same man as a member of the board, and to insure this, I employ the construction shown in Fig. 3, in which the handle Z devoted to the candidate of any party who is also candidate for president of the board has an elongation $Z^5$ which projects up above the handle Z of the key devoted to the candidate for president of the board, and has an arm or lug projecting toward the partition B', and on the side toward which the upper key Z must be turned. It results from this construction that if the upper key Z be attempted to be turned so as to cast a ballot for a man as president of the board without having previously voted for him as a member of the board, the key will be checked, and the lower key must be first operated so as to remove it from the path of the upper key. This insures the casting of a ballot for a man as a member of the board who is voted for as president of the board.

It is desirable to have some means whereby the voter must indicate his choice of any amendments or other yes and no propositions submitted before he is permitted to vote for the candidates for the offices in which he is especially interested, as proposed amendments, &c. often fail, not because of any opposition to them, but because the voters fail to indicate their choice, and although all the votes cast on a question may be in its favor, yet it will fail of passing because it does not have the necessary majority of all the votes cast. To provide for this, I provide one of the amendment arms Q' with a downwardly projecting arm A⁶ carrying a horizontal lug B⁶ projecting through an elongated horizontal slot C⁶ in the head of the vertical bar D⁶. This vertical bar may pass through the apertures formed by the straps E⁶ fastened to the partition C', although this is not absolutely essential. It has formed on its inner side, above the bars R' for the offices in which the average voter is especially interested, the lugs F⁶. When the amendment key is operated, the movement of the arm Q' will carry the arm A⁶ with it and thus will lift the rod D⁶ to the dotted line position, in which the lugs F⁶ are raised from the bars R' so as to permit of the operation of any key of the series. Until an amendment key has been operated, it will be seen that whenever it is attempted to operate any of the candidate keys, there will be a direct upward thrust of the rod D⁶ against the pin B⁶, which serves to lock the apparatus.

It will be apparent that some or all of the different series of selecting members or keys may be interlocked with other register selecting or setting members than those individual register selecting members devoted to the yes and no registers, as they may be interlocked with register selecting or setting members of any form and for any purpose without departing from the spirit of my invention, which includes in its scope the interlocking of any two or more series of register selecting or setting members, so that a member of one series must be operated before any member of the other interlocked series can be set.

Figures 20, 21, 22:
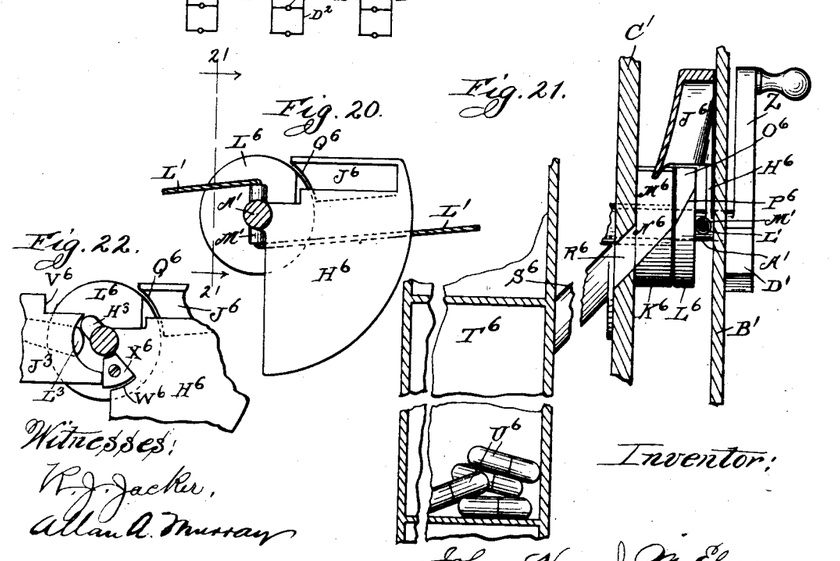
Fig. 20 is a front elevation of a portion of the irregular balloting apparatus.
Fig. 21 is a sectional view of the same on the line 21—21 of Fig. 20, in an unoperated position.
Fig. 22 is a view similar to Fig. 20 showing the necessary modification used in the multi-candidate groups.

To provide for casting irregular ballots, in case the voter desires to cast a ballot for some candidate not nominated by any party, I provide the mechanism illustrated in Figs. 4, 20, 21 and 22. The extreme right-hand vertical row of keys is devoted to the irregular balloting devices, and one of them is provided for each candidate row. These irregular balloting devices are not connected up with the air pressure pipes, but have arms Q' connected to the rods R' in the customary manner to re-set the parts. The exterior portions of the keys are the same as the ordinary construction, but at the right of and a little above each key is an elongated rectangular horizontal aperture G⁶.
The shafts A' have the same interlocking mechanism as is provided for the regularly nominated candidate keys, but rigidly attached thereto is a plate H⁶, the main portion of which is a thin segment lying next to the inner side of the partition B', and serving to close the aperture G⁶ when the key rests in its normal position. When the key is moved to its operated position, as in Figs. 20 and 22, the pocket J⁶, which is formed in the upper end of the plate H⁶, is brought opposite to the aperture G⁶. This pocket is of a generally cylindrical shape, except that it is inclined downward slightly to prevent the holder U⁶ from falling out when the key is re-set. Moreover, the axis of the pocket is inclined downward and rearward from its outer end, as seen in Fig. 21, so that the inner end of the pocket is lower and farther inward than the outer end. Rigidly fastened to the front side of the rear partition C' is an annular block K⁶ in the center of which the sleeve P' is journaled, this sleeve having in turn journaled therein the shaft A'. The inner end of the sleeve P' has an enlarged disk L⁶ fastened thereto, and this disk is of the same diameter as the annulus K⁶. The annulus K⁶ has a portion thereof cut away so as to leave the plain vertical face M⁶ and the inclined surface N⁶. The disk L⁶ has a somewhat similar cutaway portion forming the plain vertical face O⁶ and the inclined face P⁶, which in the normal position of the sleeve P' forms a continuation of the inclined surface N⁶. It will be seen that the disk L⁶ moves with the sleeve P', while the pocket J⁶ moves with the shaft A'. The innermost end of the pocket J⁶ is cut away on a curve, as at Q⁶, to correspond with the periphery of the block K⁶ and the disk L⁶ with which it coöperates. An inclined aperture R⁶ forming a continuation of the inclined surface N⁶ passes through the partition C', and by means of the chute S⁶ leads to the receptacle T⁶, which receives the holders U⁶. This receptacle T⁶, of which there is one for each irregular balloting device, will have a door provided with a lock which can be opened only by the judges of the elections. The operation of this mechanism is as follows: The key having been moved to the operated position, as shown in Figs. 8, 20 and 22, the holder U⁶, which may be of wood, metal, or any other material, and which is constructed substantially like the ordinary gelatin capsule, has placed therein a slip of paper upon which the voter has written the name of the non-nominated candidate for whom he wishes to vote. This capsule is then inserted in the opening G⁶ and passes into the pocket J⁶. In this operated position, the disk L⁶ is held by the position of the sleeve P' so that the holder can escape through the cut-away portion and past the cut-away portion of the block K⁶ as soon as the pocket J⁶ assumes a vertical position, thus permitting the holder to be deposited in the receptacle T⁶. If a voter should attempt to beat the machine by inserting the holder U⁶ and then turning the key back to its normal position, the periphery of the disk L⁶, which is still in its operated position, would form a temporary closure for the end of the pocket J⁶, and thus prevent the escape of the holder therefrom, so that the voter when he swung the key back to position to put in another ballot would find the first one still in position. Or if he operated an irregular balloting device in the same row, thus returning the irregular device to initial position, he would find the holder back in position where it could not be discharged. In the multi-candidate irregular balloting devices substantially the same construction is employed, except some slight modifications necessitated by the different form of locking mechanism employed. This construction is shown in Fig. 22, where the block $J^3$ is of the customary construction, except that it has the notch $V^6$ cut away to accommodate the end of the pocket $J^6$ in its normal position. A segmental notch $W^6$ is cut in the plate $H^6$ to accommodate the similarly shaped lug $X^6$ which is screwed or otherwise rigidly fastened to the inner side of the partition $B'$ to furnish a stop for the left-hand end of the block $J^3$.

In the apparatus hitherto described, and especially illustrated in Fig. 4, I have arranged to cut out the multi-candidate group when more than the requisite number of candidates has been voted for by shutting off the supply of air on the upper side only, and locating the group at the lower end of the machine. In some elections in the large cities, such as Chicago, a plurality of these multi-candidate groups is found, and it is necessary to provide means for separately controlling each one of these pluralities of groups. To illustrate my system as applied to such conditions, I have shown the construction in Fig. 23, which is diagrammatic in its nature, as it is not deemed necessary to illustrate all the details of the mechanism. In this figure, the keys $A^7$ represent two yes and no propositions. The keys $B^7$ represent the straight ticket valves. The keys $C^7$ represent an ordinary candidate. The keys $D^7$ represent the first multi-candidate group, and the keys $E^7$ represent ordinary candidate rows interposed between the first multi-candidate group and the second multi-candidate group of four represented by the keys $F^7$. The keys $G^7$ represent ordinary registers, and finally, the keys $H^7$ represent the last multi-candidate group. The connections for controlling these are as follows: The multi-candidate group keys $D^7$ are controlled by a pair of cylinders $T^{51}$ and $T^{52}$, which are controlled by a group device similar to that shown in Fig. 11, the only difference being that there are two of the three way cocks $U^4$, both of which are controlled by the same apparatus by reason of the upper one being formed with the bell crank $J^7$, which is connected by a link $K^7$ to the arm $L^7$ controlling the lower valve. The bell cranks $M^7$ and $N^7$ corresponding to the bell cranks $Q^5$ of Fig. 11 are arranged so as to control three way valves situated in the pipes $H^2$, and arranged in their normal position as indicated by the enlarged details adjacent to the valves, which details are lettered $O^7$ and $P^7$, respectively. The supplemental pipe $Q^7$ is arranged to open into the pipe $H^2$ as shown, and upon a consideration of the arrangement of the valves $O^7$ and $P^7$, it will be seen that whenever these valves are operated by reason of the voter having cast his ballot for more than the three candidates provided for, the exhaust air is shut off from the portion of the pipe $H^2$ between the valves $O^7$ and $P^7$, and passes through the branch or switch $Q^7$ where the valves of the keys $D^7$ cannot be operated. The pipe $D^2$ similarly has the three way valves $R^7$ and $S^7$ connected by the similar pipe $T^7$ through which the air pressure is diverted when the voter attempts to cast his ballot for more than the number of candidates permitted. It will be seen that this arrangement does not shut off the air from the valves $E^7$, $F^7$, $G^7$ and $H^7$ below, but leaves them unaffected. All of these valves $O^7$ and $R^7$ above the group are controlled by the rod $N^5$, the connections between the arms of the valves and the rod being made by an elongated slotted connection so as to permit of the arms being arranged on both sides of the rod $N^5$. The lower rod $U^7$ connecting all the valves $P^7$ and $S^7$ may be constructed as is the rod $N^5$ of Fig. 4. The group of multi-candidate keys $F^7$ is controlled by apparatus in every respect the same as that employed to control the keys $D^7$, while the group of keys $H^7$ is controlled by similar apparatus to that shown in Fig. 4, because in the lowest group there is no occasion to switch the air beyond this group to operate any other keys. The air pressure through the pipe $V^4$ will, as will be readily seen, be diverted through the cylinders $T^5$ wherever necessary, and this pipe extends down past the lowest one of these cylinders $T^5$, whence it returns by means of the return pipe $V^7$, which will be seen to be connected with the cross pipe $C^2$ in the customary manner. By employing this system of switching out the multi-candidate groups when they are over-voted without affecting the supply of air for the keys beyond them, I am enabled to employ my invention in any number of groups.

As there is a possibility that the voter might attempt to beat the machine in the multi-candidate group by actuating say two or three keys in the upper row, thus shifting the levers $Q'$ for that row and leaving the levers $Q'$ for the other rows unshifted, and then voting a straight ticket, which would operate the two party candidates in the two lower rows, thus securing a greater vote than the voter is entitled to, I provide one or more cross bars $W^7$ (see Fig. 4), which are fastened to the outer ends of the arms $Q'$, so that when any key in the multi-candidate group has been operated, all of the levers $Q'$ in that group will be operated so as to prevent the possibility of any straight ticket ballot being cast for any group candidates after any candidate has been scratched. This necessitates the voter who desires to scratch any of the group candidates, to indicate his choice for each one of the candidates for whom he desires to vote, thus compelling him to comply with the provisions of the present Australian ballot law by marking each group candidate in case any of them are scratched.

While I have herein shown and described various novel features which are not herein claimed, it is not to be understood that I thereby abandon the generic inventions disclosed but not claimed in the present application, as said generic inventions are claimed in my applications, No. 655,060, filed October 13, 1897; No. 723,873, filed July 14, 1899; No. 725,213, filed July 27, 1899; and No. 729,274, filed September 2, 1899.

While I have shown my invention as embodied in the form which I at present consider best adapted for the purposes in hand, it will be understood that it is capable of extensive modifications, and I do not desire to be limited in the interpretation of the following claims except as may be necessitated by the state of the art.

I claim:

1. In a voting machine, the combination with the registers, of plural series of register selecting members controlling the operation of said registers, means to limit the number of register setting members that may be simultaneously operated in each series, and interlocking mechanism between two or more series of said members to compel the movement of a member of one of said series before any member of another series can be moved.

2. In a voting machine, the combination with the candidate registers, of plural series of register selecting members controlling the operation of said registers, means to limit the number of register setting members that may be simultaneously operated in each series, and interlocking mechanism between two or more series of said members to compel the movement of a member of one of said series before any member of another series can be moved.

3. In a voting machine, the combination with the candidate registers, of plural series of register selecting members controlling the operation of said registers, means to limit the number of register setting members that may be simultaneously operated in each series, and interlocking mechanism between one of said series and all of the remaining series to compel the movement of a member in the first mentioned series before any member of any of the other series can be moved.

4. In a voting machine, the combination with a plural series of candidate registers, of corresponding plural series of register selecting members controlling the operation of said registers, another series of register selecting members, means to limit the number of register setting members that may be simultaneously operated in each series, and interlocking mechanism between said last mentioned series and all of the remaining series of register selecting members to compel the movement of one of said last mentioned series before any member of any of the other series can be moved.

5. In a voting machine, the combination with the registers, of plural series of register selecting members controlling the operation of said registers, means to limit the number of register setting members that may be simultaneously operated in each series, interlocking mechanism between two or more series of said members to compel the movement of a member of one of said series before any member of another series can be moved, and means for subsequently operating the registers corresponding to the operation of the register selecting members.

6. In a voting machine, the combination with the candidate registers, of plural series of register selecting members controlling the operation of said registers, means to limit the number of register setting members that may be simultaneously operated in each series, interlocking mechanism between one of said series and all of the remaining series to compel the movement of a member in the first mentioned series before any member of any of the other series can be moved, and means for subsequently operating the registers corresponding to the operation of the register selecting members.

7. In a voting machine, the combination with the plural series of candidate registers, of corresponding plural series of register selecting members controlling the operation of said registers, another series of register selecting members, means to limit the number of register setting members that may be simultaneously operated in each series, interlocking mechanism between said last mentioned series and all of the remaining series of register selecting members to compel the movement of one of said last mentioned series before any member of any of the other series can be moved, and means for subsequently operating the registers corresponding to the operation of the register selecting members.

8. In a voting machine, the combination with plural series of keys and corresponding series of registers one for each key, of a pneumatic motor for each register and a valve for each motor controlled by its key, and a source of compressed air for actuating said motors controlled by said valves.

9. In a voting machine, the combination with a series of keys and a corresponding series of registers, of a pneumatic motor for each register and a valve for each motor controlled by its key, and an air compressor for actuating said motors actuated or controlled by the exit of the voter from the booth.

10. In a voting machine, the combination of a series of candidate keys, selecting apparatus for said registers, with pneumatic motors for actuating said registers and a source of power for said motors, and a compound valve for each motor controlling the supply of air thereto, one member of said valve being connected to and controlled by the position of the selecting apparatus, and the other member of all the valves being connected and moved in unison by any actuation of the selecting apparatus.

11. In a voting machine, the combination of a plurality of keys, and a plurality of registers controlled thereby, with a plurality of motors for operating said registers adapted to be actuated by a variation of the usual pressure, controlling valves therefor, and means controlled by the voter for varying the pressure in said valves.

12. In a voting machine, the combination of the rotating reciprocating key Z, a ballot indicating device controlled thereby, with its adjacent key Z having the extension $Z^5$ projecting into the path of the first mentioned key, and having a ballot indicating device controlled thereby, so that the actuation of the first ballot indicating device necessitates the actuation of the second ballot indicating device substantially as described.

13. In a voting machine, the combination of the rotary key Z having the notches H′ therein, with the casing D′ and the spring-pressed lug F′ therein coöperating with said notches, substantially as described.

14. In a voting machine, the combination of the rotary key Z having the notches H′ therein and the shoulders J′ and K′ thereon, with the casing D′ and the spring-pressed lug F′ therein coöperating with said notches and shoulders, substantially as described.

15. In a voting machine, the combination of the reciprocating key shaft A′ having the three-way aperture therein, with the sleeve P′ having the coöperating three apertures, and the sleeve $E^2$ having the aperture T′.

16. In a voting machine, the combination of the reciprocating key shaft A′ having the three-way aperture therein, with the sleeve P′ having the coöperating three apertures, and the sleeve $E^2$ having the aperture T′ and the pipes $F^2$ and $J^2$ connected therewith.

17. In a device of the class described, the combination with a register, of a piston for actuating the same, and means for varying the pressure on one side of said piston while it remains normal on the opposite side.

18. In a voting machine, the combination with a series of keys, arranged in party rows and office groups, with a series of registers controlled thereby, pistons for actuating said registers, and means for varying the pressure on one side of said piston while it remains normal on the opposite side, said means being controlled by the position of said keys.

19. In a voting machine, the combination with the casing, of the registers contained therein, plural series of register-selecting members controlling the operation of said registers extending through the casing, means located within the casing to limit the number of register-selecting members that may be simultaneously operated in each series, and interlocking mechanism within the casing between two or more series of said members to compel the movement of a member of one of said series before any member of another series can be moved.

20. In a voting machine, the combination with a casing, of the candidate registers within the casing, plural series of register-selecting members projecting into the casing controlling the operation of said registers, means to limit the number of register-selecting members that may be simultaneously operated in each series, and interlocking mechanism located within the casing between two or more series of said members to compel the movement of a member of one of said series before any member of another series can be moved.

21. In a voting machine, the combination with the casing, of the candidate registers located therein, plural series of register-selecting members extending into the casing controlling the operation of said registers, means to limit the number of register-selecting members that may be simultaneously operated in each series, and interlocking mechanism located within the casing between one of said series and all of the remaining series to compel the movement of a member in the first-mentioned series before any member of any of the other series can be moved.

22. In a voting machine, the combination with the casing, of the plural series of candidate registers located therein, corresponding plural series of register-selecting members controlling the operation of said registers, another series of register-selecting members, all of said register-selecting members extending within the casing, means to limit the number of register-selecting members that may be simultaneously operated in each series, and interlocking mechanism located within the casing between said last-mentioned series and all of the remaining series of register-selecting members to compel the movement of one of said last-mentioned series before any member of any of the other series can be moved.

23. In a voting machine, the combination with a casing, of the registers located therein, plural series of register-selecting members extending into the casing and controlling the operation of said registers, means to limit the number of register-selecting members that may be simultaneously operated in each series, interlocking mechanism within the casing between two or more series of said members to compel the movement of a member of one of said series before any member of another series can be moved, and means for subsequently operating the registers corresponding to the operation of the register-selecting members.

24. In a voting machine, the combination with the casing, of the candidate registers located therein, plural series of register-selecting members extending into the casing and controlling the operation of said registers, means to limit the number of register-selecting members that may be simultaneously operated in each series, interlocking mechanism within the casing between one of said series and all of the remaining series to compel the movement of a member in the first-mentioned series before any member of any of the other series can be moved, and means for subsequently operating the registers corresponding to the operation of the register-selecting members.

25. In a voting machine, the combination with a casing, of the plural series of candidate registers located therein, corresponding plural series of register-selecting members extending into the casing and controlling the operation of said registers, another series of register-selecting members extending into the casing, means to limit the number of register-selecting members that may be simultaneously operated in each series, interlocking mechanism within the casing between said last-mentioned series and all of the remaining series of register-selecting members to compel the movement of one of said last-mentioned series before any member of any of the other series can be moved, and means for subsequently operating the registers corresponding to the operation of the register-selecting members.

26. In a voting machine, the combination with the casing, of the registers therein, plural series of rotating keys journaled in and extending into the casing for controlling the operation of said registers, means to limit the number of keys that may be simultaneously operated in each series, and interlocking mechanism within the casing between two or more series of said keys to compel the movement of a key of one of said series before any key of another series can be moved.

27. In a voting machine, the combination with a casing, of the candidate registers therein, plural series of rotating keys journaled in the casing and extending therein and controlling the operation of said registers, means to limit the number of keys that may be simultaneously operated in each series, and interlocking mechanism within the casing between two or more series of said keys to compel the movement of a key of one of said series before any key of another series can be moved.

28. In a voting machine, the combination with a casing, of the candidate registers located therein, plural series of rotating keys journaled in and extending into the casing and controlling the operation of said registers, means to limit the number of keys that may be simultaneously operated in each series, and interlocking mechanism within the casing between one of said series and all of the remaining series to compel the movement of a key in the first-mentioned series before any key of any of the other series can be moved.

29. In a voting machine, the combination with the casing, of plural series of candidate registers located therein, corresponding plural series of rotating keys journaled in and extending into said casing and controlling the operation of said registers, another series of rotating keys journaled in and extending into said casing, means to limit the number of keys that may be simultaneously operated in each series, and interlocking mechanism within the casing between said last-mentioned series and all of the remaining series of keys to compel the movement of one of said last-mentioned series before any key of any of the other series can be moved.

30. In a voting machine, the combination with the casing, of the registers located therein, plural series of rotating keys journaled in and extending into said casing and controlling the operation of said registers, means to limit the number of keys that may be simultaneously operated in each series, interlocking mechanism within the casing between two or more series of said keys to compel the movement of a key of one of said series before any key of another series can be moved, and means for subsequently operating the registers corresponding to the operation of the keys.

31. In a voting machine, the combination with the casing, of the candidate registers located therein, plural series of rotating keys journaled in and extending into said casing and controlling the operation of said registers, means to limit the number of keys that may be simultaneously operated in each series, interlocking mechanism within the casing between one of said series and all of the remaining series to compel the movement of a key in the first-mentioned series before any key of any of the other series can be moved, and means for subsequently operating the registers corresponding to the operation of the keys.

32. In a voting machine, the combination with the casing, of the plural series of candidate registers located therein, corresponding plural series of rotating keys journaled in and extending into said casing and controlling the operation of said registers, another series of rotating keys journaled in and extending into said casing, means for limiting the number of keys that may be simultaneously operated in each series, interlocking mechanism within the casing between said last-mentioned series and all of the remaining series of keys to compel the movement of one of said last-mentioned series before any key of any of the other series can be moved, and means for subsequently operating the registers corresponding to the operation of the keys.

33. In a voting machine, the combination with the casing, of the registers therein, plural series of keys extending into said casing for controlling the operation of said registers, means to limit the number of keys that may be simultaneously operated in each series, and interlocking mechanism within the casing between two or more series of said keys to compel the movement of a key of one of said series before any key of another series can be moved.

34. In a voting machine, the combination with a casing, of the candidate registers therein, plural series of keys extending into said casing and controlling the operation of said registers, means to limit the number of keys that may be simultaneously operated in each series, and interlocking mechanism within the casing between two or more series of said keys to compel the movement of a key of one of said series before any key of another series can be moved.

35. In a voting machine, the combination with a casing, of the candidate registers located therein, plural series of keys extending into the casing and controlling the operation of said registers, means to limit the number of keys that may be simultaneously operated in each series, and interlocking mechanism within the casing between one of said series and all of the remaining series to compel the movement of a key in the first-mentioned series before any key of any of the other series can be moved.

36. In a voting machine, the combination with the casing, of the plural series of candidate registers located therein, corresponding plural series of keys extending into said casing and controlling the operation of said registers, another series of keys extending into said casing, means to limit the number of keys that may be simultaneously operated in each series, and interlocking mechanism within the casing between said last-mentioned series and all of the remaining series of keys to compel the movement of one of said last-mentioned series before any key of any of the other series can be moved.

37. In a voting machine, the combination with the casing, of the registers located therein, plural series of keys extending into said casing and controlling the operation of said registers, means to limit the number of keys that may be simultaneously operated in each series, interlocking mechanism within the casing between two or more series of said keys to compel the movement of a key of one of said series before any key of another series can be moved, and means for subsequently operating the registers corresponding to the operation of the keys.

38. In a voting machine, the combination with the casing, of the candidate registers located therein, plural series of keys extending into said casing and controlling the operation of said registers, means to limit the number of keys that may be simultaneously operated in each series, interlocking mechanism within the casing between one of said series and all of the remaining series to compel the movement of a key in the first-mentioned series before any key of any of the other series can be moved, and means for subsequently operating the registers corresponding to the operation of the keys.

39. In a voting machine, the combination with the casing, of the plural series of candidate registers located therein, corresponding plural series of keys extending into said casing and controlling the operation of said registers, another series of keys extending into said casing, means for limiting the number of keys that may be simultaneously operated in each series, interlocking mechanism within the casing between said last-mentioned series and all of the remaining series of keys to compel the movement of one of said last-mentioned series before any key of any of the other series can be moved, and means for subsequently operating the registers corresponding to the operation of the keys.

40. In a voting machine, the combination of two series of ballot-indicating devices, with connections whereby one of the devices of one of said series must be moved for operation before any of the devices of the second series may be operated, and a corresponding series of candidate registers associated with the ballot indicating devices of one of said series, each register being adapted to be advanced to count one vote for the candidate to which it is devoted if its associated ballot indicating device is effectively operated by the voter.

41. In a voting machine, the combination with a plurality of series of ballot-indicating devices, such as keys, of corresponding series of ballot-registering mechanisms, the operation of which is controlled by the position of the corresponding ballot-indicating devices, mechanism for limiting the number of the ballot-indicating devices that may be simultaneously moved to operative position, connections between the ballot-indicating devices of two of said series, whereby one of the ballot-indicating devices of one of said series must be moved to operative position before any of the ballot-indicating devices in the other series may be moved to operative position, and means for operating all of the ballot-registering mechanisms whose ballot-indicating devices are in operative position.

42. In a voting machine, the combination of a series of ballot-indicating devices, with other series of ballot-indicating devices, an individual ballot registering mechanism for each of the ballot-indicating devices of both series, and connections between each device of said first series with one of the devices of said other series, whereby when one of said first series is moved for operation, it will necessitate its connected device being moved for operation and the consequent operation of the two ballot registering mechanisms associated with the two keys.

JOHN HOWARD McELROY.

Witnesses:
LOUISE SERAGE,
ALLAN A. MURRAY.